United States Patent
Sudo

(10) Patent No.: US 7,901,134 B2
(45) Date of Patent: Mar. 8, 2011

(54) SEMICONDUCTOR TEMPERATURE SENSOR

(75) Inventor: Toru Sudo, Chiba (JP)

(73) Assignee: Seiko Instruments Inc., Chiba (JP)

( * ) Notice: Subject to any disclaimer, the term of this patent is extended or adjusted under 35 U.S.C. 154(b) by 379 days.

(21) Appl. No.: 12/201,835

(22) Filed: Aug. 29, 2008

(65) Prior Publication Data

US 2009/0059997 A1    Mar. 5, 2009

(30) Foreign Application Priority Data

Aug. 30, 2007    (JP) .................. 2007-224125

(51) Int. Cl.
*G01K 7/00*    (2006.01)
(52) U.S. Cl. .................. 374/173; 374/178; 327/512
(58) Field of Classification Search .................. 374/173, 374/178; 327/512
See application file for complete search history.

(56) References Cited

U.S. PATENT DOCUMENTS

| | | | | |
|---|---|---|---|---|
| 5,585,752 | A * | 12/1996 | Botti et al. ................. | 327/131 |
| 6,144,246 | A * | 11/2000 | Wachter ..................... | 327/513 |
| 2002/0130709 | A1* | 9/2002 | Teel et al. .................. | 327/540 |
| 2004/0130378 | A1* | 7/2004 | Kihara ........................ | 327/362 |
| 2007/0285153 | A1* | 12/2007 | Hasegawa ................... | 327/543 |
| 2010/0008398 | A1* | 1/2010 | Nojima ....................... | 374/178 |

FOREIGN PATENT DOCUMENTS

JP    3128013 B    11/2000

* cited by examiner

Primary Examiner — Lisa M Caputo
Assistant Examiner — Mirellys Jagan
(74) Attorney, Agent, or Firm — Brinks Hofer Gilson & Lione

(57) ABSTRACT

Provided is a semiconductor temperature sensor having satisfactory linearity of an output voltage with respect to temperature. In a semiconductor temperature sensor (1), even if the temperature increases and a leakage current is generated at bases of a PNP (8) and a PNP (9), a current which flows into emitters of a PNP (7) and the PNP (8) is not affected by the leakage current by virtue of a leakage current compensation current of a PNP (14), and thus, the linearity of the output voltage with respect to the temperature is improved and the accuracy of the semiconductor temperature sensor (1) with respect to the temperature is improved.

4 Claims, 2 Drawing Sheets

SEMICONDUCTOR TEMPERATURE SENSOR

RELATED APPLICATIONS

This application claims priority under 35 U.S.C. §119 to Japanese Patent Application No. JP2007-224125 filed on Aug. 30, 2007, the entire content of which is hereby incorporated by reference.

BACKGROUND ART

The present invention relates to a semiconductor temperature sensor.

A conventional semiconductor temperature sensor is described. FIG. 3 is a circuit diagram illustrating the conventional semiconductor temperature sensor.

PNP bipolar transistors (PNPs) 202-204 are in Darlington connection. A constant current is supplied to respective emitters of the PNPs 202-204. Based on the constant current and the temperature, an output voltage which is a sum of base-emitter voltage $V_{BE}$ of the PNPs 202-204 is output (see, for example, JP 3128013 B).

Next, a structure in cross-section of the PNPs 202-204 of the conventional semiconductor temperature sensor is described. FIG. 4 is a cross-sectional view illustrating a PNP of a semiconductor temperature sensor.

The PNPs 202-204 have a P⁻ silicon substrate 102, an N diffusion layer 103, a P⁺ diffusion layer 104, an N⁺ diffusion layer 105, a P⁺ diffusion layer 106, an intermediate insulating layer 107, a collector electrode 108, an emitter electrode 109, and a base electrode 110. The N diffusion layer 103 and the N⁺ diffusion layer 105 form a base region, the P⁺ diffusion layer 104 forms an emitter region, and the P⁻ silicon substrate 102 and the P⁺ diffusion layer 106 form a collector region.

However, in the conventional semiconductor temperature sensor, as the temperature increases, a leakage current is generated at a junction between the N diffusion layer 103 and the P⁻ silicon substrate 102. More specifically, the leakage current is generated at bases of the PNPs 203 and 204 (leakage current between the bases and collectors of the PNPs 203 and 204). Because the leakage current is a part of constant current passing through the emitters of the PNPs 202 and 203, it follows that an emitter current of the PNPs 202 and 203 decreases correspondingly. This results in correspondingly lower base-emitter voltage $V_{BE}$ of the PNPs 202 and 203, and thus, linearity of an output voltage with respect to the temperature becomes worse.

SUMMARY OF THE INVENTION

The present invention has been made in view of the above-mentioned problem, and an object of the present invention is to provide a semiconductor temperature sensor having satisfactory linearity of an output voltage with respect to temperature.

In order to solve the above-mentioned problem, the present invention provides a semiconductor temperature sensor including: a constant current circuit for causing a constant current to flow; a Darlington circuit having a plurality of first bipolar transistors which are in Darlington connection, for outputting an output voltage based on the constant current and temperature, the Darlington circuit having a leakage current generated therein at bases of the plurality of first bipolar transistors based on the temperature; a first current mirror circuit having a plurality of current-mirror connected first transistors, for supplying a current based on the constant current to emitters of the plurality of first bipolar transistors of the Darlington circuit; a leakage current compensation circuit having a second bipolar transistor, for causing a leakage current compensation current to flow through a base of the second bipolar transistor based on the leakage current; and a second current mirror circuit having a plurality of current-mirror connected second transistors, for supplying a current based on the leakage current compensation current to the bases of the plurality of first bipolar transistors.

In the semiconductor temperature sensor according to the present invention, even if the temperature increases and the leakage current is generated at the bases of the first bipolar transistors, the current which flows into the emitters of the first bipolar transistors is not affected by the leakage current by virtue of the leakage current compensation current of the second bipolar transistor, and thus, the linearity of the output voltage with respect to the temperature is improved and the accuracy of the semiconductor temperature sensor with respect to the temperature is improved.

DETAILED DESCRIPTION OF THE PREFERRED EMBODIMENTS

Figure 1:
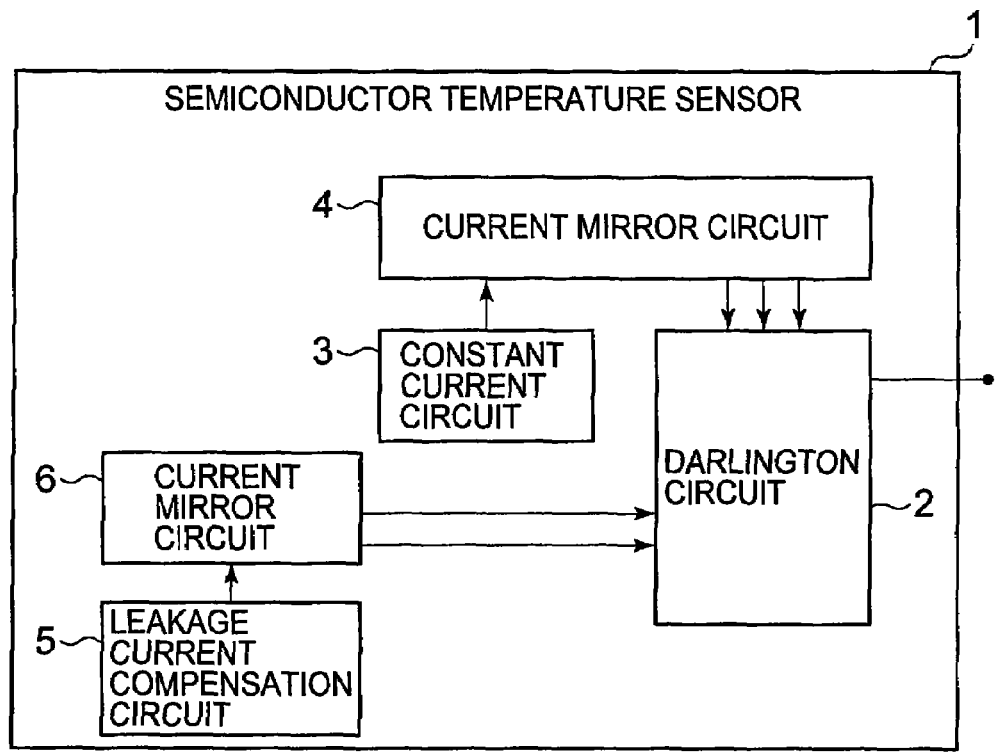
FIG. 1 is a block diagram illustrating a semiconductor temperature sensor according to the present invention.

First, an overview of a structure of a semiconductor temperature sensor according to the present invention is described. FIG. 1 is a block diagram of the semiconductor temperature sensor according to the present invention.

A semiconductor temperature sensor 1 includes a constant current circuit 3, a current mirror circuit 4, a Darlington circuit 2, a leakage current compensation circuit 5, and a current mirror circuit 6. The constant current circuit 3 is connected to the Darlington circuit 2 via the current mirror circuit 4. The leakage current compensation circuit 5 is connected to the Darlington circuit 2 via the current mirror circuit 6.

The current mirror circuit 4 has a plurality of first MOS transistors (not shown) and the plurality of first MOS transistors are current-mirror connected. The plurality of first MOS transistors are the same in size. The current mirror circuit 6 has a plurality of second MOS transistors (not shown) and the plurality of second MOS transistors are current-mirror connected. The plurality of second MOS transistors are the same in size. The Darlington circuit 2 has a plurality of first bipolar transistors (not shown) and the plurality of first bipolar transistors are in Darlington connection. The plurality of first bipolar transistors are the same in size. The leakage current compensation circuit 5 has a second bipolar transistor (not shown).

The first bipolar transistors of the Darlington circuit 2 and the second bipolar transistor of the leakage current compensation circuit 5 are formed on one semiconductor substrate and are disposed in proximity to one another on a mask layout such that the characteristics thereof are the same.

Next, an overview of operation of the semiconductor temperature sensor according to the present invention is described.

The constant current circuit 3 causes a constant current to flow. The current mirror circuit 4 supplies, to emitters of the plurality of first bipolar transistors of the Darlington circuit 2, a current based on the constant current from the constant current circuit 3 at an arbitrary current mirror ratio. Based on the constant current from the constant current circuit 3 and the temperature, the Darlington circuit 2 outputs an output voltage which is the sum of base-emitter voltage $V_{BE}$ of the plurality of first bipolar transistors.

As the temperature increases, according to the temperature, a leakage current is generated at bases of the first bipolar transistors of the Darlington circuit 2 (leakage current between bases and collectors of the first bipolar transistors). Based on the leakage current, the second bipolar transistor of the leakage current compensation circuit 5 causes a leakage current compensation current to flow through the base. The current mirror circuit 6 supplies, to the bases of the plurality of first bipolar transistors of the Darlington circuit 2, a current based on the leakage current compensation current at an arbitrary current mirror ratio. More specifically, the leakage current compensation circuit 5 and the current mirror circuit 6 are in association with each other and supply, to the bases of the first bipolar transistors of the Darlington circuit 2, a current which is substantially equal to the leakage current generated at the bases of the first bipolar transistors of the Darlington circuit 2.

Here, the current supplied to the bases of the first bipolar transistors of the Darlington circuit 2 based on the leakage current compensation current is determined by an emitter area ratio between the first bipolar transistors of the Darlington circuit 2 and the second bipolar transistor of the leakage current compensation circuit 5 and the current mirror ratio of the current mirror circuit 6.

Figure 2:
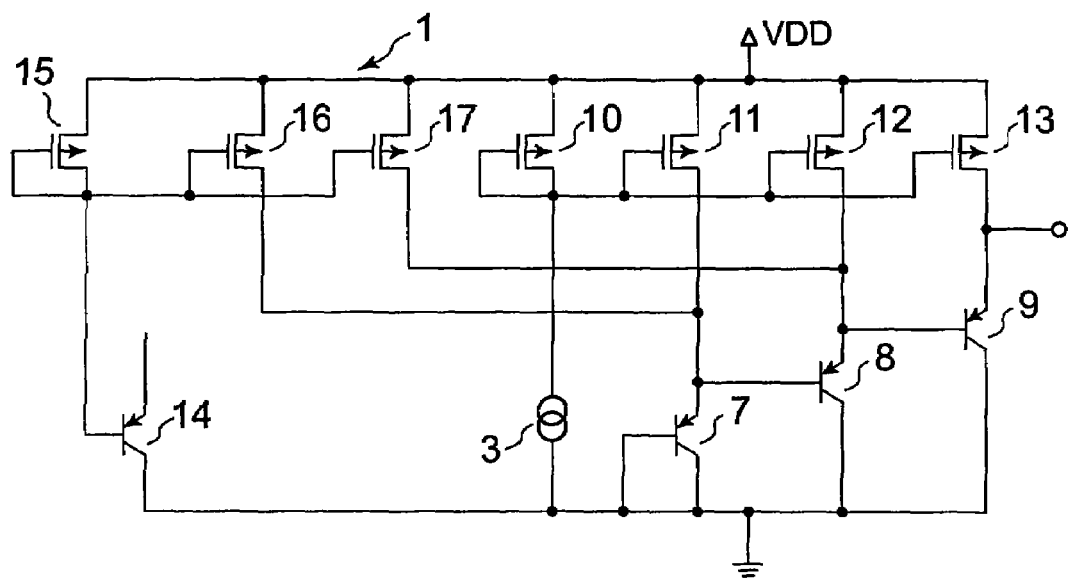
FIG. 2 is a circuit diagram illustrating the semiconductor temperature sensor according to the present invention.
Figure 3:
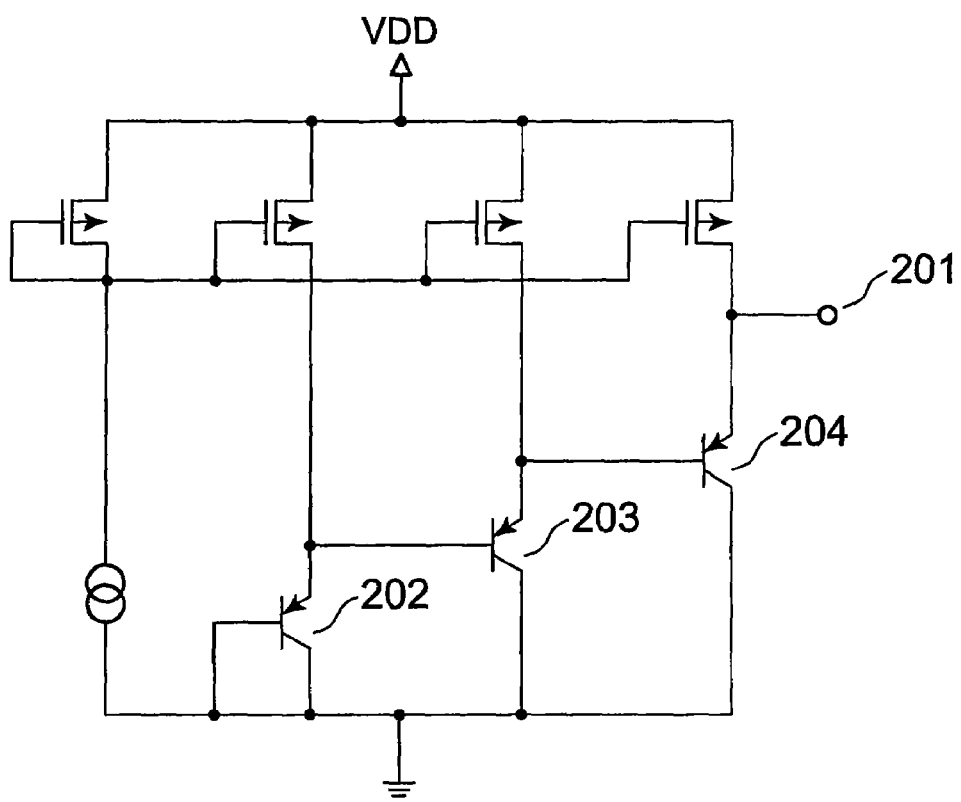
FIG. 3 is a circuit diagram illustrating a conventional semiconductor temperature sensor.
Figure 4:
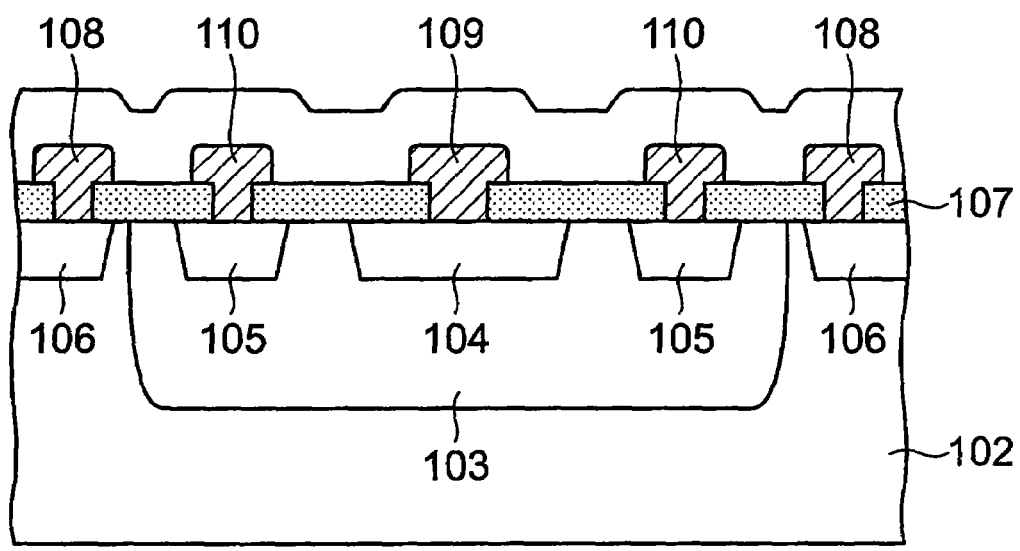
FIG. 4 is a cross-sectional view illustrating a PNP of the conventional semiconductor temperature sensor

Next, the structure of the semiconductor temperature sensor 1 is described in detail. FIG. 2 is a circuit diagram illustrating the semiconductor temperature sensor according to the present invention.

The semiconductor temperature sensor 1 includes the constant current circuit 3, PMOS transistors (PMOSs) 10-13, PNP bipolar transistors (PNPs) 7-9, a PNP 14, and PMOSs 15-17. One end of the constant current circuit 3 is connected to a gate and a drain of the PMOS 10 while the other end of the constant current circuit 3 is connected to a ground terminal. A source of the PMOS 10 is connected to a power supply terminal. A gate of the PMOS 11 is connected to the gate of the PMOS 10, a source of the PMOS 11 is connected to the power supply terminal, and a drain of the PMOS 11 is connected to an emitter of the PNP 7. A gate of the PMOS 12 is connected to the gate of the PMOS 10, a source of the PMOS 12 is connected to the power supply terminal, and a drain of the PMOS 12 is connected to an emitter of the PNP 8. A gate of the PMOS 13 is connected to the gate of the PMOS 10, a source of the PMOS 13 is connected to the power supply terminal, and a drain of the PMOS 13 is connected to an emitter of the PNP 9. In other words, the PMOSs 10-13 are current-mirror connected. A base and a collector of the PNP 7 are connected to the ground terminal. A base of the PNP 8 is connected to the emitter of the PNP 7 and a collector of the PNP 8 is connected to the ground terminal. A base of the PNP 9 is connected to the emitter of the PNP 8 and a collector of the PNP 9 is connected to the ground terminal. In other words, the PNPs 7-9 are in Darlington connection. An emitter of the PNP 14 is open-circuit and a collector of the PNP 14 is connected to the ground terminal. A gate and a drain of the PMOS 15 is connected to a base of the PNP 14 and a source of the PMOS 15 is connected to the power supply terminal. A gate of the PMOS 16 is connected to the gate of the PMOS 15, a source of the PMOS 16 is connected to the power supply terminal, and a drain of the PMOS 16 is connected to the base of the PNP 8. A gate of the PMOS 17 is connected to the gate of the PMOS 15, a source of the PMOS 17 is connected to the power supply terminal, and a drain of the PMOS 17 is connected to the base of the PNP 9. In other words, the PMOSs 15-17 are current-mirror connected.

The PNPs 7-9 and the PNP 14 are formed on one semiconductor substrate and are disposed in proximity to one another on a mask layout such that the characteristics thereof are the same.

Here, the PMOSs 10-13 correspond to the current mirror circuit 4, the PNPs 7-9 correspond to the Darlington circuit 2, the PNP 14 corresponds to the leakage current compensation circuit 5, and the PMOSs 15-17 correspond to the current mirror circuit 6.

Next, the operation of the semiconductor temperature sensor 1 is described in detail.

Here, the emitter area of the PNPs 7-9 is the same as the emitter area of the PNP 14, the current mirror ratio of the PMOSs 10-13 is 1:1:1:1, and the current mirror ratio of the PMOSs 15-17 is 1:1:1.

The constant current circuit 3 causes a constant current to flow. The MOSs 11-13 supplies a current which is equal to the constant current from the constant current circuit 3 to the emitters of the PNPs 7-9. Based on the constant current and the temperature, the emitter of the PNP 9 outputs an output voltage which is the sum of the base-emitter voltage $V_{BE}$ of the PNPs 7-9.

Further, as the temperature increases (for example, when the temperature increases to 130° C.), according to the temperature, a leakage current is generated at the bases of the PNPs 8 and 9 (leakage current between the bases and the collectors of the PNPs 8 and 9). A leakage current compensation current which is substantially equal to the leakage current is supplied to the base of the PNP 14, and the PNP 14 causes the leakage current compensation current to flow to the drain of the PMOS 15. The PMOSs 16 and 17 supplies a current which is equal to the leakage current compensation current to the bases of the PNPs 8 and 9 (to a junction between the emitter of the PNP 7 and the base of the PNP 8, and a junction between the emitter of the PNP 8 and the base of the PNP 9) as their drain current. More specifically, the PNP 14 and the PMOSs 15-17 are in association with each other and supply, to the bases of the PNPs 8 and 9, a current which is substantially equal to the leakage current generated at the bases of the PNPs 8 and 9.

Here, the current supplied to the bases of the PNPs 8 and 9 based on the leakage current compensation current is determined by the emitter area ratio between the PNPs 7-9 and the PNP 14 and the current mirror ratio of the PMOSs 15-17.

Through the above-mentioned operation, even if the temperature increases and a leakage current is generated at the bases of the PNPs 8 and 9, a current which flows into the emitters of the PNPs 7 and 8 is not affected by the leakage current by virtue of the leakage current compensation current of the PNP 14, and thus, the linearity of the output voltage with respect to the temperature is improved and the accuracy of the semiconductor temperature sensor 1 with respect to the temperature is improved.

It is to be noted that, for example, the constant current circuit 3 has a depletion NMOS transistor (not shown). A gate and a source of the depletion NMOS transistor is connected to the ground terminal and a drain of the depletion NMOS transistor is connected to the drain of the PMOS 10.

Further, although, in the above-mentioned description, the emitter of the PNP 14 is open-circuit, it is sufficient that an emitter voltage is applied to the emitter of the PNP 14 such that a current between the base and the emitter is sufficiently smaller than the leakage current compensation current between the base and the collector, and thus, the emitter of the PNP 14 may be connected to the ground terminal. In both of the former and latter cases, the leakage current compensation current flows between the base and the collector.

Further, although, in the above-mentioned description, the emitter area of the PNPs 7-9 is the same as the emitter area of the PNP 14 and the current mirror ratio of the PMOSs 15-17 is 1:1:1, it is sufficient that the leakage current generated at the bases of the PNPs 8 and 9 are equal to the drain current of the PMOSs 16 and 17, respectively, and thus, the above-mentioned emitter areas do not necessarily have to be the same and the above-mentioned current mirror ratio does not necessarily have to be 1:1:1. Here, for example, when the emitter area of the PNP 14 is smaller than the emitter area of the PNPs 8 and 9, the driving ability of the PMOSs 16 and 17 is better than the driving ability of the PMOS 15 correspondingly.

The invention claimed is:

1. A semiconductor temperature sensor, comprising:
   a constant current circuit for causing a constant current to flow;
   a Darlington circuit having a plurality of first bipolar transistors which are in Darlington connection, for outputting an output voltage based on the constant current and temperature, the Darlington circuit having a leakage current generated therein at bases of the plurality of first bipolar transistors based on the temperature;
   a first current mirror circuit having a plurality of current-mirror connected first transistors, for supplying a current based on the constant current to emitters of the plurality of first bipolar transistors of the Darlington circuit;
   a leakage current compensation circuit having a second bipolar transistor, for causing a leakage current compensation current to flow through a base of the second bipolar transistor based on the leakage current; and
   a second current mirror circuit having a plurality of current-mirror connected second transistors, for supplying a current based on the leakage current compensation current to the bases of the plurality of first bipolar transistors.

2. A semiconductor temperature sensor according to claim 1, wherein the plurality of first bipolar transistors and the second bipolar transistor are formed on one semiconductor substrate and are disposed in proximity to one another on a mask layout.

3. A semiconductor temperature sensor according to claim 1, wherein the second bipolar transistor has a base provided at an input terminal of the second current mirror circuit, an emitter open-circuit, and a collector connected to a ground terminal.

4. A semiconductor temperature sensor according to claim 1, wherein the second bipolar transistor has a base provided at an input terminal of the second current mirror circuit, and an emitter and a collector connected to a ground terminal.

* * * * *